(12) United States Patent
Matsushita et al.

(10) Patent No.: US 7,967,094 B2
(45) Date of Patent: Jun. 28, 2011

(54) CONSTRUCTION MACHINE

(75) Inventors: Makoto Matsushita, Ibaraki (JP); Takeshi Takei, Ibaraki (JP); Wataru Isaka, Ibaraki (JP); Katsutoshi Watanabe, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 252 days.

(21) Appl. No.: 12/445,193

(22) PCT Filed: Nov. 8, 2007

(86) PCT No.: PCT/JP2007/072136
§ 371 (c)(1),
(2), (4) Date: Apr. 10, 2009

(87) PCT Pub. No.: WO2008/065894
PCT Pub. Date: Jun. 5, 2008

(65) Prior Publication Data
US 2010/0236855 A1 Sep. 23, 2010

(30) Foreign Application Priority Data

Nov. 28, 2006 (JP) ................................ 2006-320251

(51) Int. Cl.
*B62D 25/24* (2006.01)
(52) U.S. Cl. .................. 180/69.2; 180/89.17; 180/89.1; 280/762

(58) Field of Classification Search ............... 180/69.2, 180/89.17, 89.1–89.13; 280/166, 762
See application file for complete search history.

(56) References Cited

U.S. PATENT DOCUMENTS

| | | | | |
|---|---|---|---|---|
| 4,131,172 A | * | 12/1978 | Wolfgram | 180/69.24 |
| 7,806,214 B2 | * | 10/2010 | Tsukui et al. | 180/89.17 |

FOREIGN PATENT DOCUMENTS

| | | |
|---|---|---|
| JP | 8-183350 A | 7/1996 |
| JP | 2004-190276 A | 7/2004 |
| JP | 2004-308376 A * | 11/2004 |

* cited by examiner

*Primary Examiner* — Ruth Ilan
(74) *Attorney, Agent, or Firm* — Mattingly & Malur, P.C.

(57) ABSTRACT

A machine room (15) is provided between a cab (14) and a counterweight (6) which are mounted on a revolving frame (5) to accommodate an engine (7). The machine room (15) is built of a left front support member (20), a rear support member (21), a connecting support member (22) and a left side housing door (25). A horizontal grip portion (22B) and an inclined grip portion (22C) are provided in intermediate portions of the connecting support member (22) which connects the left front support member (20) and the rear support member (21). By opening the left side housing door (25), the inclined grip portion (22C) of the connecting support member (22) comes out, permitting a servicing worker to hold on thereto helping him or her perform a cleaning job of a rear face portion (14B) of a cab (14) in an efficient manner.

6 Claims, 15 Drawing Sheets

CONSTRUCTION MACHINE

TECHNICAL FIELD

This invention relates to a construction machine like a hydraulic excavator, wheel loader or the like.

BACKGROUND ART

Generally, a hydraulic excavator, for example, is largely constituted by an automotive lower structure, an upper revolving structure rotatably mounted on the lower structure, and a working mechanism built on the front side of the upper revolving structure to be lifted up and down in relation with swing motions of the upper revolving structure, for example, for a ground excavating operation.

In the case of an excavator as mentioned above, the upper revolving structure is including a revolving frame which is in the form of a strong support structure, and a base end portion of the working mechanism is attached to the front side of the revolving frame. A counterweight is attached to the rear side of the revolving frame as a weight balance relative to the working mechanism. Further, an engine and a heat exchanger are mounted on the revolving frame at positions on the front side of the counterweight. These engine and heat exchanger are accommodated in a machine room which has an engine cover. Furthermore, a cab is built on a left front portion of the revolving frame to provide an operator's room on the front side of the engine cover of the machine room (e.g., see Japanese Patent Laid-Open No. H8-183350).

In the case of the above-mentioned hydraulic excavator of the prior art, a front support member and a rear support member are erected on a left side portion of the revolving frame. Provided between the front and rear support members is a louver having a plural number of stays set at regular intervals in the fashion of grating. The louver serves to enhance the rigidity of the front and rear support members.

By the way, in the case of a small-size hydraulic excavator which is small in gross weight (e.g., smaller than 7 tons), normally the excavator is provided with an engine cover which can be opened and closed, for example, by a servicing worker on the ground at the time of inspection of an engine and a heat exchanger inside. There is little possibility of a servicing worker climbing onto the engine cover.

Accordingly, at the time of cleaning from outside a rear window pane at the rear face portion of a cab, for example, a servicing worker climbs onto a crawler belt of a lower structure instead of the engine cover to reach out his or her hand to the rear face portion of the cab. That is to say, a servicing worker has to perform and continue a cleaning job of the rear face portion of the cab in an instable posture, despite inefficiency of the cleaning job.

In this regard, the above-mentioned prior art employs a louver having a plural number of stays set at regular intervals in the fashion of a grating between front and rear support members on the back side of a cab. In this case, however, a servicing worker who has climbed onto a crawler belt cannot grab the louver like a hand-rail for the purpose of stabilizing his or her posture while performing a cleaning job on the crawler belt.

DISCLOSURE OF THE INVENTION

In view of the above-mentioned problem with the prior art, it is an object of the present invention to provide a construction machine with arrangements which facilitate cleaning jobs on a cab and other parts of the machine.

According to the present invention, in order to achieve the above-stated object, the present invention is applied to a construction machine, having a frame as a support structure which is provided with a working mechanism and a counterweight in front and rear sides thereof, respectively, a cab which is built on a front side of the frame and forms an operator's room, and a machine room which is built on the frame at a position between the cab and the counterweight to accommodate an engine, the machine room being built of a front support member erected on the frame on the rear side of the cab, a rear support member erected on the frame and at a space from the front support member, a connecting support member connecting the front support member with the rear support member, and a housing door openably fitted between the front and rear support members.

(1) The construction machine according to the invention is characterized in that the connecting support member is formed with a grip portion used as a hand-rail while the housing door is in an open state, permitting a servicing worker to hold on to the grip portion.

With the arrangements just described, for example, when the construction machine is put in operation with the housing door in a closed state, the connecting support member can be accommodated in a machine room. On the other hand, at the time of performing a cleaning job, the connecting support member can be used as a hand-rail while the housing door is in an open state, permitting a servicing worker to grab a grip portion. By holding on to the grip portion of the connecting support member, the servicing worker can perform a cleaning job safely in an efficient manner.

(2) Further, according to the present invention, the connecting support member is fixedly attached to the front and rear support members at fore and rear ends, respectively, and formed with a longitudinally extending grip portion in an intermediate section between the fore and rear ends.

In this case, the grip portion of the connecting support member is extended in forward and rearward directions between the front and rear support members. Therefore, a servicing worker can perform a cleaning job efficiently over a broader range by holding onto the grip portion of the connecting support member for support.

(3) Further, according to the invention, the connecting support member is formed by bending a hollow metal pipe into a suitable shape.

The connecting support member in the form of a metal pipe can be easily bent into a suitable shape. This is advantageous particularly in a case where the connecting support member is required to be formed in a complicate shape to avoid interferences with equipments in the machine room.

(4) On the other hand, according to the invention, an air cleaner is attached to the engine to supply clean air to the engine, and a heat exchanger is mounted on the frame at a position between the engine and the housing door, the rear support member being adapted to support the air cleaner, and the connecting support member being located transversely between the heat exchanger and the housing door.

With the arrangements just described, the connecting support member is adapted to connect the front support member to the rear support member on which the air cleaner is supported, enhancing the strength of support for the air cleaner. Besides, the connecting support member is located transversely between the heat exchanger and housing door, preventing a machine operator or servicing worker from inadvertently touching the heat exchanger at the time of grabbing the grip portion of the connecting support member and permitting a servicing worker to perform a cleaning job in a safe and efficient manner.

(5) Further, in the case of the construction machine in (4) above, preferably an equipment room is defined beneath the connecting support member by the front support member, rear support member, heat exchanger and housing door to accommodate the air cleaner and other onboard equipments.

Consequently, the narrow space of the equipment room, which is provided beneath the connecting support member, can be effectively utilized with less spatial losses for accommodation of various onboard equipments including an air cleaner.

BEST MODE FOR CARRYING OUT THE INVENTION

Figure 1:
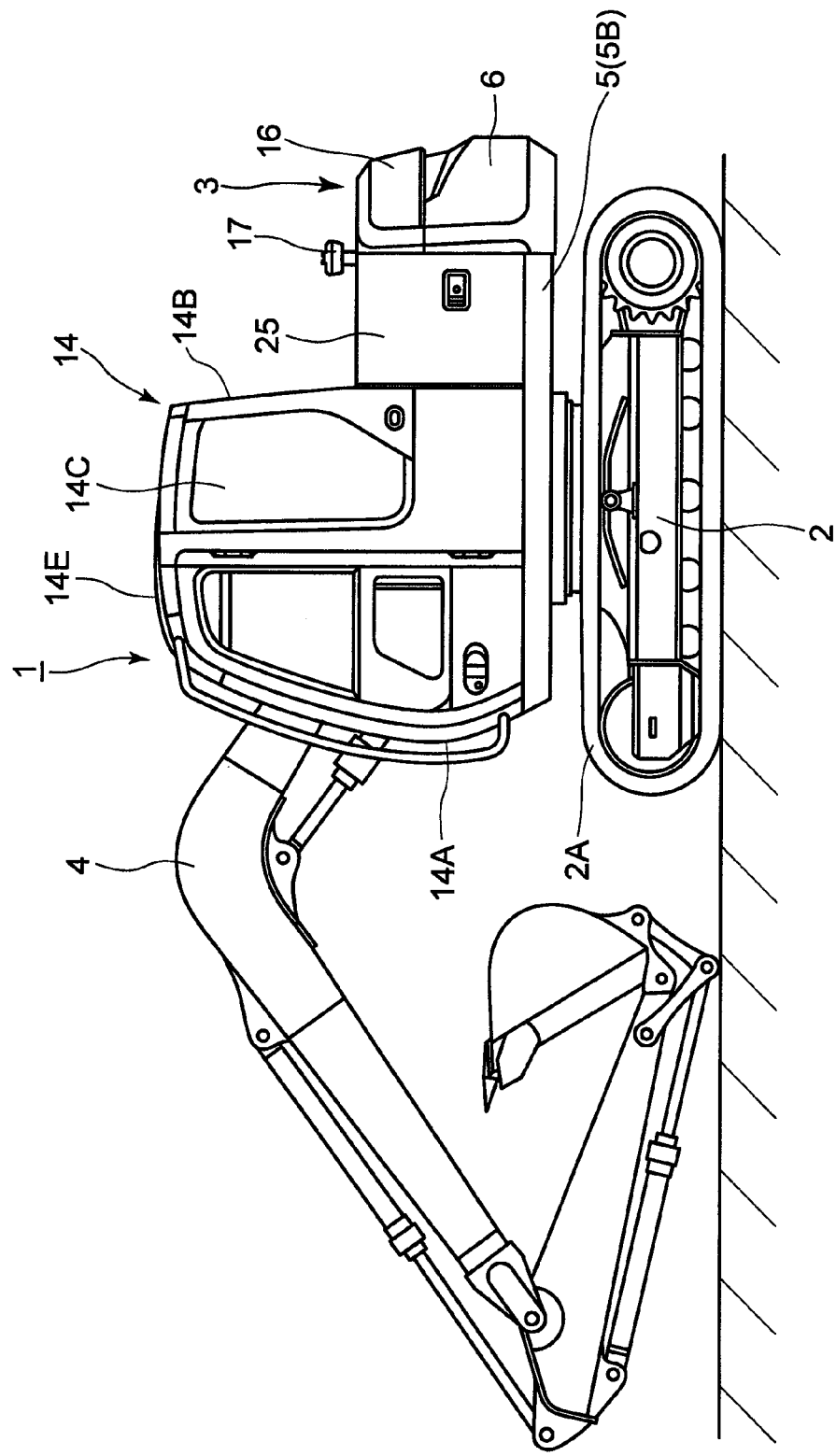
FIG. 1 is a front view of a hydraulic excavator embodying the present invention.

Hereafter, with reference to FIGS. 1 through 15, the present invention is described more particularly by way of its preferred embodiments which are applied by way of example to a hydraulic excavator.

In the drawings, indicated at 1 is a hydraulic excavator as a typical example of construction machines. The hydraulic excavator 1 is built as a small size hydraulic excavator which is, for example, smaller than 7 tons in gross weight, and largely constituted by an automotive lower structure 2 with right and left crawler belts 2A, an upper revolving structure 3 rotatably mounted on the lower structure 2, and a working mechanism 4 liftably mounted on a front portion of the upper revolving structure 3. The upper revolving structure 3 is largely constituted by a revolving frame 5, a counterweight 6, a cab 14 and a machine room 15, which will be described hereinafter.

Figure 3:
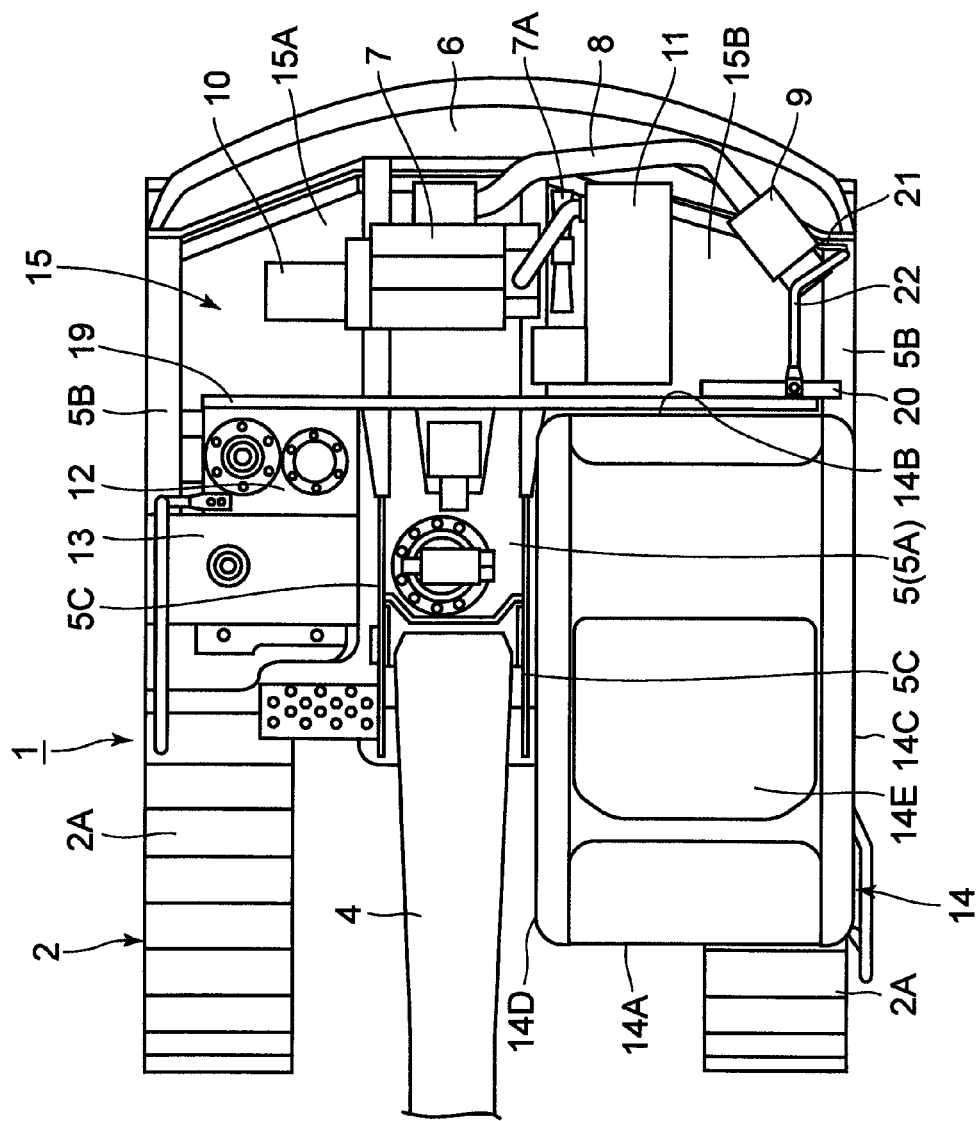
FIG. 3 is a plan view of the excavator, with an engine cover removed to show the inside.

Indicated at 5 is a revolving frame which constitutes a base of the upper revolving structure 3. As shown in FIGS. 1 and 3, the revolving frame 5 is built into a strong support structure, composed of a center frame 5A which is extended in forward and rearward directions at a transversely intermediate position, right and left side frames 5B which are located on the opposite sides of the center frame 5A, and a plural number of side beams (not shown) projected toward the side frames 5B from the center frame 5A in such a way as to interconnect the center and side frames 5A and 5B.

Figure 2:
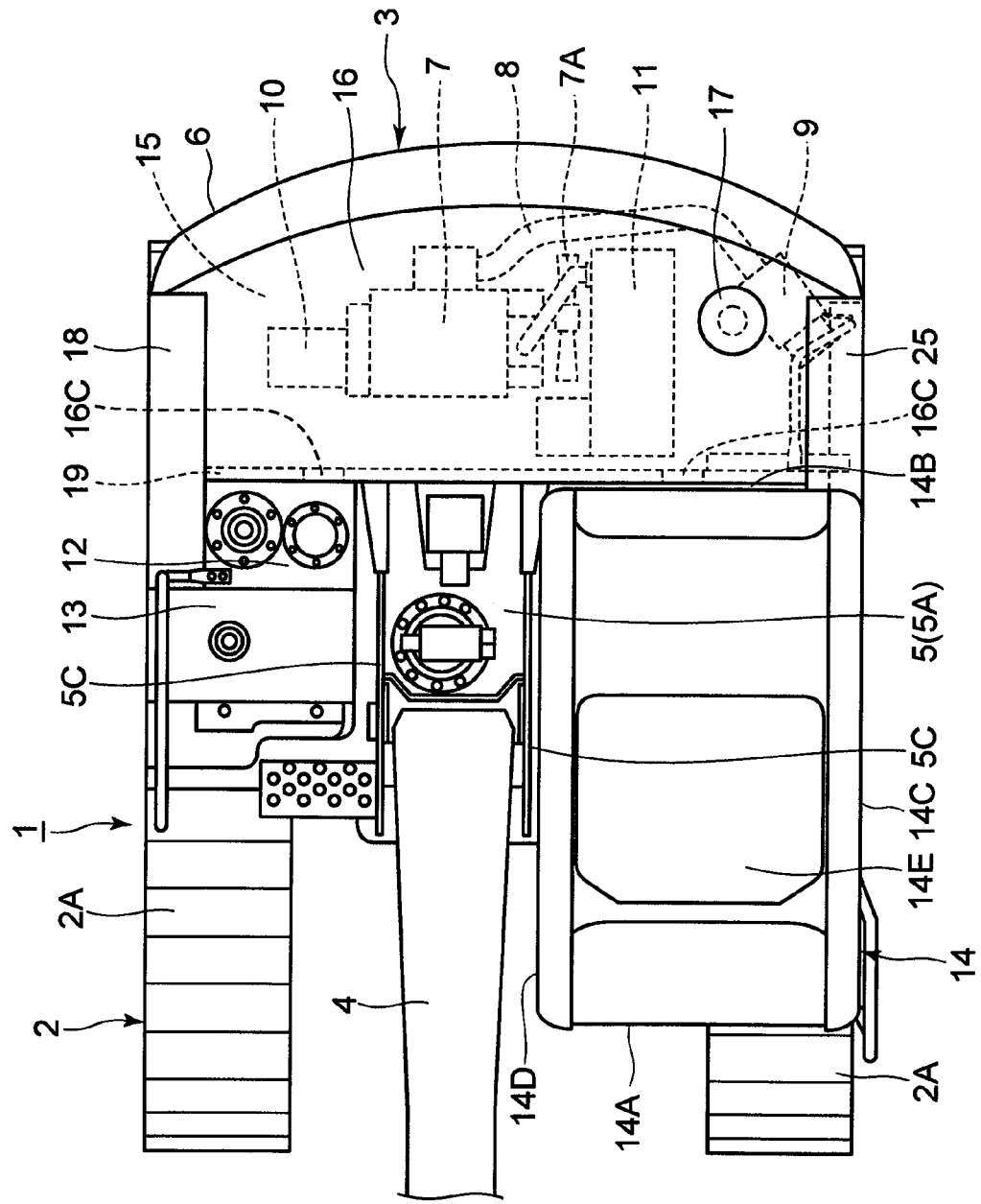
FIG. 2 is a plan view of the excavator.

In this instance, as shown in FIGS. 2 and 3, the center frame 5A of the revolving frame 5 is provided with right and left vertical plates 5C which are disposed face to face with each other and extended in forward and rearward directions. A base end portion of the working mechanism 4 is pivotally supported on front end portions of these vertical plates 5C, while a counterweight 6 is mounted on rear end portions of the vertical plates 5C, as described below.

Denoted at 6 is a counterweight which is attached to the rear side of the revolving frame 5. This counterweight 6 is mounted on rear end portions of the right and left vertical plates 5C of the revolving frame 5 as a counterbalance of the working mechanism 4 thereby to keep the weight balance of the upper revolving structure 3 as a whole. Further, located on the front side of the counterweight 6 are engine 7 and heat exchanger 11, which will be described later on.

Figure 4:
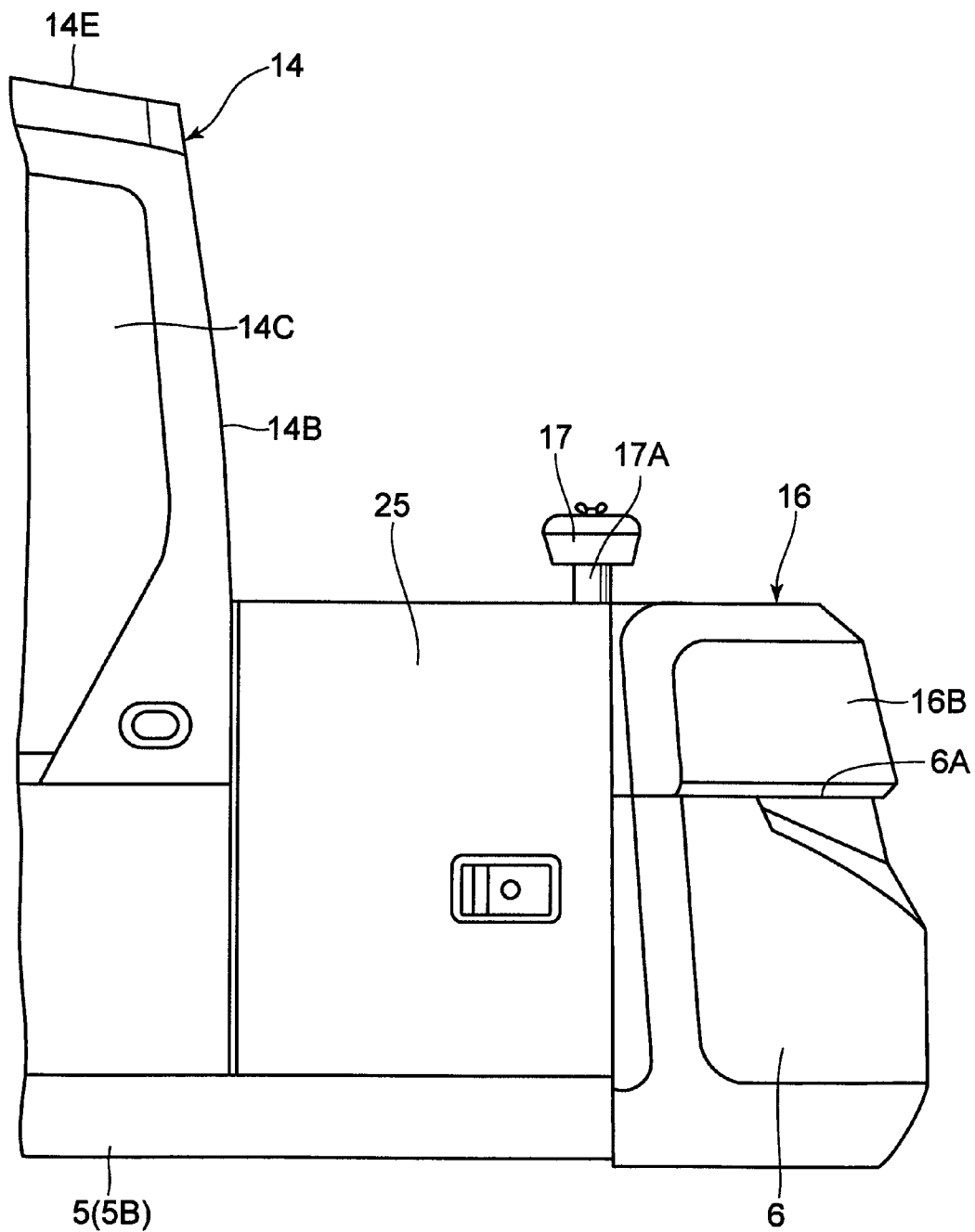
FIG. 4 is a front view showing the engine cover and left side housing door in FIG. 1 on an enlarged scale.
Figure 5:
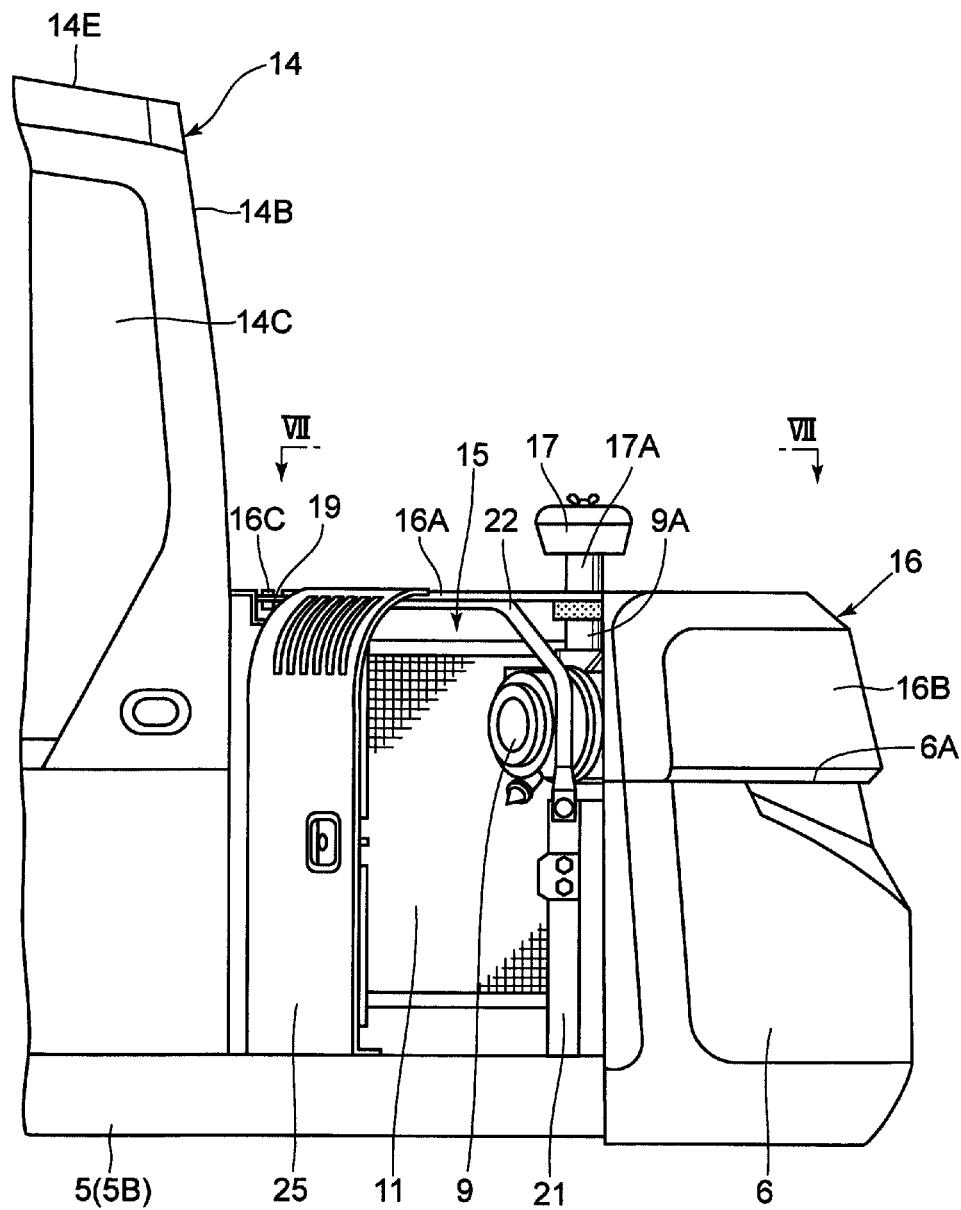
FIG. 5 is a front view showing the left side housing door in FIG. 4 in an open state.
Figure 6:
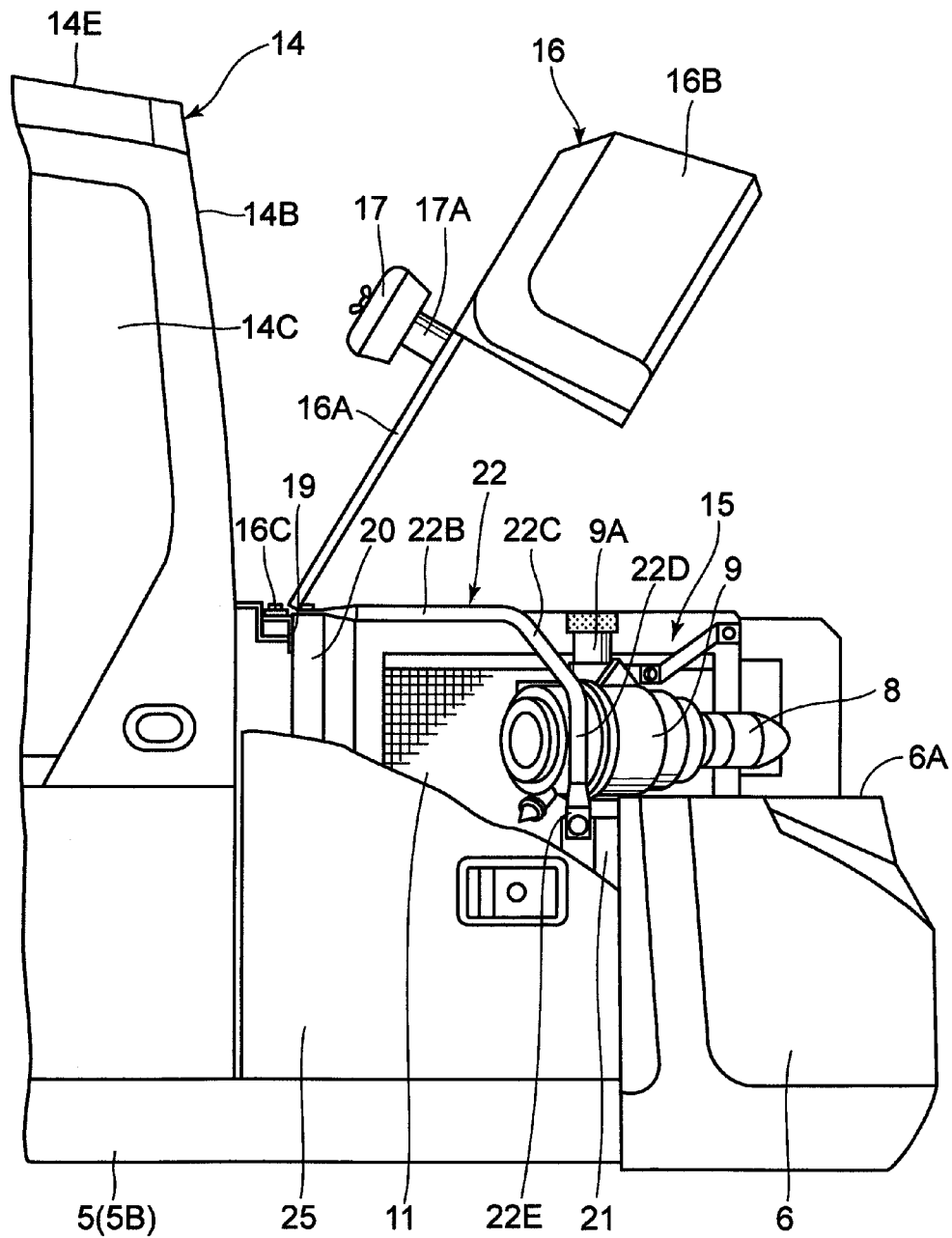
FIG. 6 is a front view showing the engine cover in an open state and the left side housing door which is partly cut away.

In this instance, as shown in FIGS. 4 through 6, the top surface 6A of the counterweight 6 is located at a lower level than the top surface of a left side housing door 25, which will be described hereinafter. From upper side, the counterweight 6 is covered by an upper plate member 16A and a rear plate member 16B of an engine cover 16, which will be described hereinafter. Therefore, in this case, when the engine cover 16 is in an open position, a servicing worker M who stands on top of a crawler belt 2A of the lower structure 2 would find it difficult to hold on to an upper end portion of the counterweight 6 for the purpose of stabilizing his or her posture.

Indicated at 7 is an engine which is mounted on the revolving frame 5 at a position on the front side of the counterweight 6. The engine 7 is transversely mounted on the right and left vertical plates 5C of the revolving frame 5, and accommodated in an engine room 15A of a machine room 15, which will be described hereinafter. A cooling fan 7A is located on the left side of the engine 7 to supply cooling air to a heat exchanger 11 which will be described later on. Located on the right side of the engine 7 is a hydraulic pump 10 which will also be described later on.

Indicated at 8 is an intake pipe which supplies air to the engine 7. A base end side (downstream end) of this intake pipe 8 is connected to the intake side of the engine 7, while a distal end side (an upstream end) of the intake pipe 8 is extended into an equipment room 15B which will be described hereinafter. An air cleaner 9 is attached to the distal end side (an upstream end) of the intake pipe 8 as described below.

Denoted at 9 is a centrifugal type air cleaner which is attached to the distal end side (an upstream end) of the intake pipe 8. This air cleaner 9 plays a role of cleaning air to be supplied to the engine 7 through the intake pipe 8, by centrifugally getting rid of dust from intake air prior to supply to the engine 7. In this case, the air cleaner 9 is supported in position by a rear support member 21, which will be described later on, and accommodated in an equipment room 15B which will also be described later on. An air inlet 9A of the air cleaner 9 is projected upward and connected to an air outlet 17A of a pre-cleaner 17, which will be described hereinafter.

Indicated at 10 is a hydraulic pump which is attached to the right side of the engine 7. This hydraulic pump 10 is driven by the engine 7 to deliver operating pressure oil to various hydraulic actuators on the lower structure 2, upper revolving structure 3 and working mechanism 4.

Indicated at 11 is a heat exchanger which is mounted on the revolving frame 5 at a position between the engine 7 and a left side housing door 25, which will be described hereinafter, in face to face relation with a cooling fan 7A of the engine 7. For example, the heat exchanger 11 is composed of a radiator in the role of cooling off engine cooling water, an oil cooler in the role of cooling off operating oil, and an intercooler in the role of cooling compressed air of a turbo-supercharger (not shown). All of the above-mentioned engine 7, air cleaner 9, hydraulic pump 10 and heat exchanger 11 are openably covered with an engine cover 16 from upper side.

Indicated at 12 is an operating oil tank which is located in a right front side of the revolving frame 5 to serve as a reservoir of operating oil to be supplied to various hydraulic actuators which are mounted on the hydraulic excavator 1. Indicated at 13 is a fuel tank which is located on the front side of the operating oil tank 12 to serve as a reservoir of a fuel to be supplied to the engine 7.

Designated at 14 is a cab which is built in a left front side of the revolving frame 5, i.e., on the left side of the working mechanism 4. This cab 14 internally defines an operating room for an operator of the machine. In this instance, the cab 14 is formed in a box-like shape, and enclosed by a front face portion 14A, a rear face portion 14B, a left side face portion 14C, a right side face portion 14D and an upper side face portion 14E. Within the cab 14, various control levers to be operated by an operator are provided alongside an operator's seat (all not shown).

A transparent window pane is fitted in each one of the front face portion 14A, rear face portion 14B, left side face portion 14C, right side face portion 14D and upper side face portion 14E, so that an operator in the cab can take a view of the outside through a transparent window pane almost in all directions. The window panes in the front, rear, left side, right side and upper side face portions 14A to 14E are cleaned by an operator or servicing worker M on a regular basis.

Indicated at 15 is a machine room which is provided on the revolving frame 5 at a position between the rear side of the cab 14 and the front side of the counterweight 6. As shown in FIG. 3, this machine room 15 is partitioned into an engine room 15A for accommodation of the engine 7, hydraulic pump 10 and heat exchanger 11, and an equipment room 15B for accommodation of the air cleaner 9 and a connecting support member 22 which will be described hereinafter. The machine room 15 is extended transversely between the cab 14 and the counterweight 6, and constituted by an engine cover 16, right side housing door 18, left front support member 20, rear support member 21, connecting support member 22 and left side housing door 25, which will be described later on.

Indicated at 16 is an openable engine cover which is arranged to cover the engine 7 from upper side. As shown in FIG. 2, this engine cover 16 is extended transversely between the cab 14 and the counterweight 6 and adapted to cover the engine 7 entirely from upper side, air cleaner 9, hydraulic pump 10 and heat exchanger 11 which are mounted on the front side of the counterweight 6. In this instance, as shown in FIGS. 5 and 6, the engine cover 16 is largely constituted by a flat plate-like upper plate member 16A and a rear plate member 16B which is inclined downward from a rear end side of the upper plate member 16A in such a way as to adjoin smoothly to a rear face portion of the counterweight 6.

At a front end portion, the upper plate member 16A of the engine cover 16 is hinged on an engine cover mount member 19, which will be described hereinafter, by the use of right and left hinge mechanisms 16C, permitting the rear plate member 16B to be an free end. Thus, the engine cover 16 can be swung up and down about the hinge mechanisms 16C to take either a closed position of FIG. 5 or an open position of FIG. 6. When the engine cover 16 is opened, the engine 7, air cleaner 9, hydraulic pump 10 and heat exchanger 11 become accessible from the ground level for inspection. Further, when the engine cover 16 is closed, the engine 7 as well as the counterweight 6 is covered by the engine cover 16 from upper side. In the closed position, as shown in FIGS. 4 and 5, the top surface of the engine cover 16 is disposed substantially flush with a top surface of the left side housing door 25, which will be described hereinafter.

Indicated at 17 is a pre-cleaner which is mounted on top surface side of the engine cover 16. This pre-cleaner 17 serves to get rid of dust in intake air streams prior to supply to the air cleaner 9. In this instance, as shown in FIGS. 5 and 6, the pre-cleaner 17 is moved up and down together with the engine cover 16 when the latter is opened and closed. When the engine cover 16 is in the closed position (in the position of FIG. 5), an air outlet 17A of the pre-cleaner 17 is connected with an air inlet 9A of the air cleaner 9. On the other hand, when the engine cover 16 is in the open position (in the position of FIG. 6), the air outlet 17A of the pre-cleaner 17 is disengaged and located away from the air inlet 9A of the air cleaner 9.

Accordingly, upon starting the engine 7 with the engine cover 16 in the closed position, air is supplied from the air outlet 17A of the pre-cleaner 17 to the air inlet 9A of the air cleaner 9 and then to the engine 7 after getting rid of dust in intake air streams by the pre-cleaner 17 and the air cleaner 9. Thus, by the two-stage dust screening through the pre-cleaner 17 and the air cleaner 9, cleaned air alone is supplied to the engine 7 through the intake pipe 8.

Indicated at 18 is a right side housing door which is located continuously on the right side of the engine cover 16. This right side housing door 18 is formed of a thin steel sheet or the like and extended in forward and rearward directions between the fuel tank 13 and a right end portion of the counterweight 6. The right side housing door 18 is arranged to cover openably the engine 7 and hydraulic pump 10 from the right side.

Now, described below with reference to FIGS. 5 through 11 are left front support member 20, rear support member 21 and connecting support member 22 which are employed to support a left side housing door 25, which will be described hereinafter.

Indicated at 19 is an engine cover mount member which is provided on the revolving frame 5 at a position on the front side of the engine 7. It is on this engine cover mount member 19 that front end portions of the engine cover 16 are hinged by the use of the hinge mechanisms 16C. In this instance, the engine cover mount member 19 is formed, for example, by the use of L-shaped angle steel, and, as shown in FIG. 3, extended on and along the revolving frame 5 in the transverse direction in such a way as to partition off the engine 7 and heat exchanger 11 from the cab 14, one end portion (the left end) of the engine cover mount member 19 being fixed to a left front support member 20, which will be described hereinafter, while the other end portion (the right end) being fixed to the operating oil tank 12.

Denoted at 20 is a left front support member which is erected on the revolving frame 5 at a position on the rear side of the cab 14. As shown in FIGS. 6 through 10, this left front support member 20 is erected on the revolving frame 5 at a position behind the left end of the engine cover mount member 19, in face to face relation with the rear face portion 14B of the cab 14, and extended as far as the side frame 5B. In this instance, the left front support member 20 is provided with a riser face portion 20A which is extended upward from the revolving frame 5 in face to face relation with the rear face portion 14B of the cab 14, the riser face portion 20A being provided with an upper end face portion 20B which is bent in a rearward direction from an upper end of the riser face portion 20A, and a vertical side end face portion 20C which is bent in a rearward direction from a left end portion of the riser face portion 20A. Attached fixedly on the upper end face portion 20B of the left front support member 20 is a fore end of a connecting support member 22, which will be described hereinafter, and attached fixedly on the vertical side end face portion 20C of the left front support member 20 is a front end of a left side housing door 25, which will also be described hereinafter. In this instance, the left front support member 20 and the left side housing door 25 are arranged to have substantially the same measure in height to define the machine room 15 in cooperation with each other.

Indicated at 21 is a rear support member which is provided on a left rear portion of the revolving frame 5 at a position on the rear side of the left front support member 20. As shown in FIGS. 5 through 10, the rear support member 21 is erected on the side frame 5B of the revolving frame 5 in face to face relation with the front side of the counterweight 6. In this instance, the rear support member 21 is provided with a riser face portion 21A rising upward from the revolving frame 5 in face to face relation with the front side of the counterweight 6, an upper end face portion 21B, which is bent in a forward direction at an upper end of the riser face portion 21A, and a vertical side end face portion 21C which is bent in a forward direction on and along the side frame 5B at a left end of the riser face portion 21A. The air cleaner 9 is mounted on the upper end face portion 21B of the rear support member 21. Attached to the vertical side end face portion 21C of the rear support member 21 is a rear end portion of a left side housing door 25, which will be described later on. In this instance, as shown in FIG. 6, the rear support member 21 is lower in height than the left front support member 20, and the upper end of the rear support member 21 is at a slightly lower level than the top surface 6A of the counterweight 6.

Denoted at 22 is a connecting support member adopted in the present embodiment. This connecting support member 22 is located in a position under the engine cover 16 and bridged between the left front support member 20 and the rear support member 21. The connecting support member 22 serves to enhance rigidity of the left front support member 20 and rear support member 21 against loads acting in a forward or rearward direction.

In this instance, as shown in FIGS. 5 through 10, the connecting support member 22 is formed by bending and shaping a metal pipe of a circular sectional shape, for example, on a press machine. More specifically, the connecting support member 22 is constituted by a fore mounting portion 22A formed in a plate-like shape by press-forming, a horizontal grip portion 22B extended rearward in the horizontal direction from the fore mounting portion 22A, an inclined grip portion 22C extended angularly downwardly in the rearward direction from the rear end portion of the horizontal grip portion 22B, a vertical portion 22D extended vertically from the rear end portion of the inclined grip portion 22C, and a rear mounting portion 22E formed in a plate-like shape by press-forming at the down end portion of the vertical portion 22D.

The fore mounting portion 22A of the connecting support member 22 is fixed on the upper end face portion 20B of the left front support member 20 by means of a bolt 23, while the rear mounting portion 22E is fixed on the vertical side end face portion 21C of the rear support member 21 by means of a bolt 24. In this instance, the horizontal grip portion 22B and the inclined grip portion 22C in intermediate sections of the connecting support member 22 are extended in a direction from the left front support member 20 toward the rear support member 21 between the heat exchanger 11 and a left side housing door 25 in the transverse direction and at a level on the upper side of the air cleaner 9.

Thus, the connecting support member 22 is arranged in such a way as to evade the air cleaner 9 in connecting the left front support member 20 to the rear support member 21 to enhance the rigidity of these front and rear support members 20 and 21 against loads acting in a forward or rearward direction. The horizontal grip portion 22B of the connecting support member 22 comes into abutment against the lower side of the upper plate member 16A of the engine cover 16 when the latter is flatly closed position shown in FIG. 5. Thus, in this case, the connecting support member 22 also plays the role of supporting the engine cover 16 from beneath when the latter is in the closed position.

Figure 7:
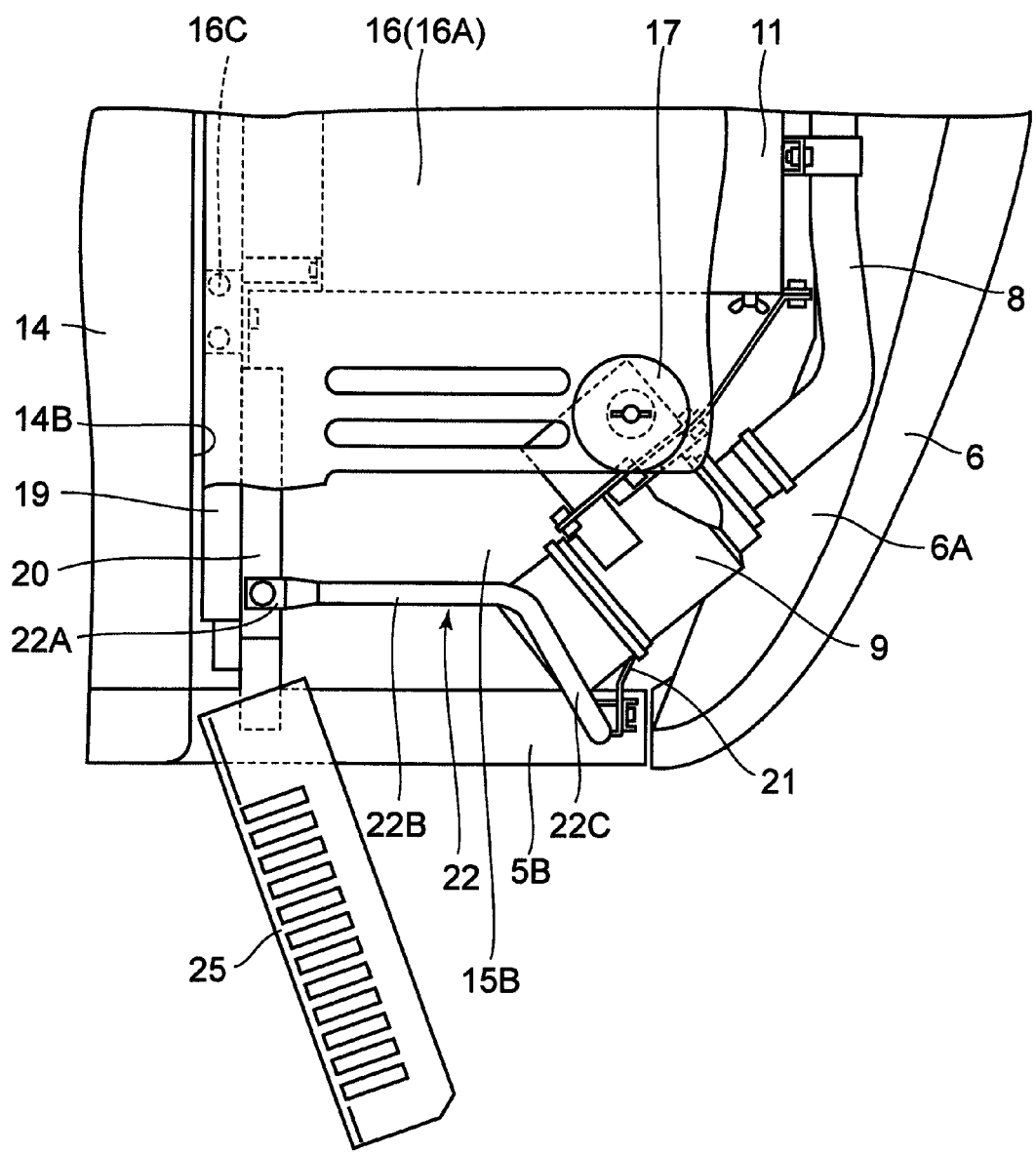
FIG. 7 is a plan view of a left front support member, rear support member and connecting support member, taken from the direction of arrows VII-VII in FIG. 5.
Figure 8:
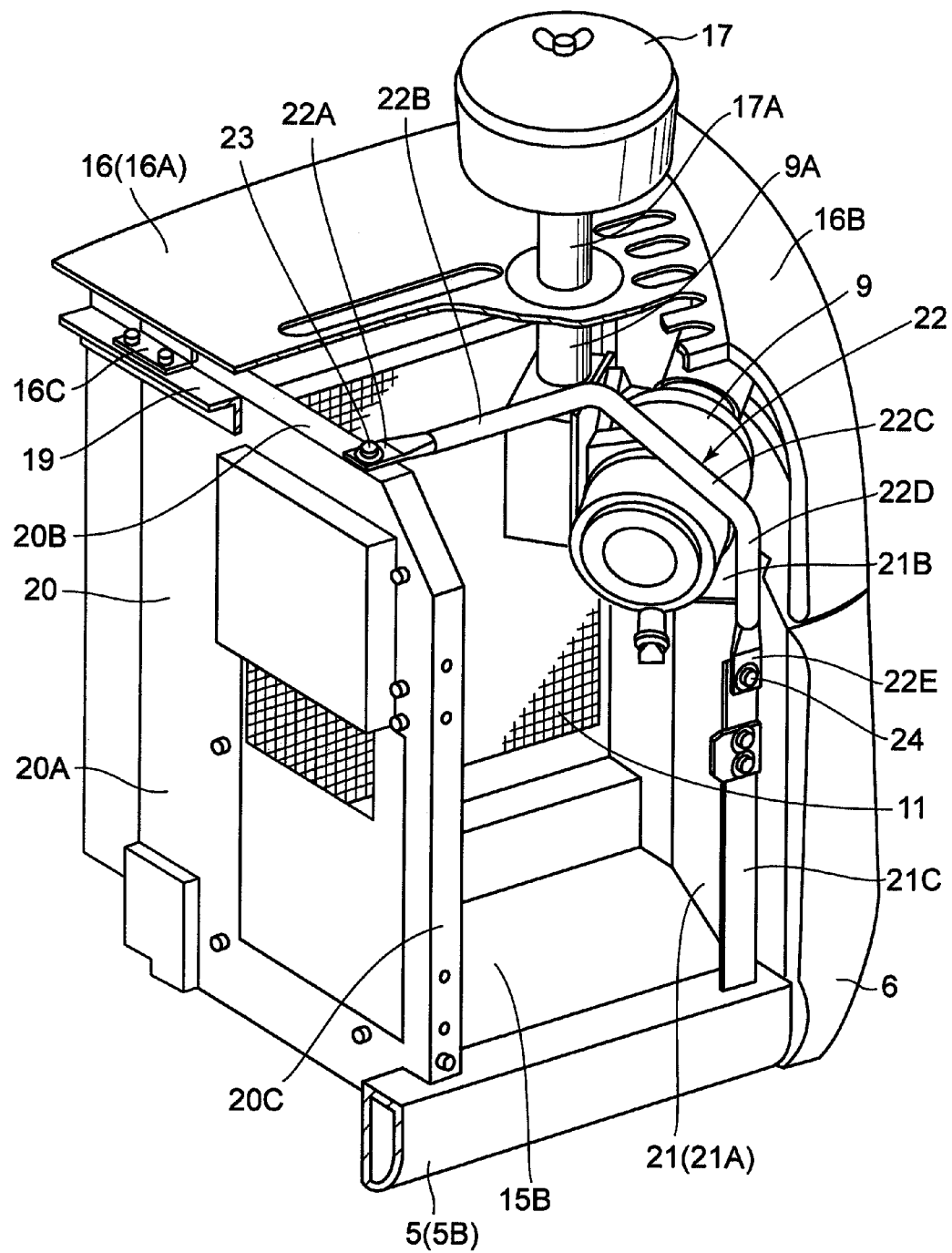
FIG. 8 is a partly cutaway perspective view of the left front support member, rear support member, connecting support member and air cleaner.
Figure 9:
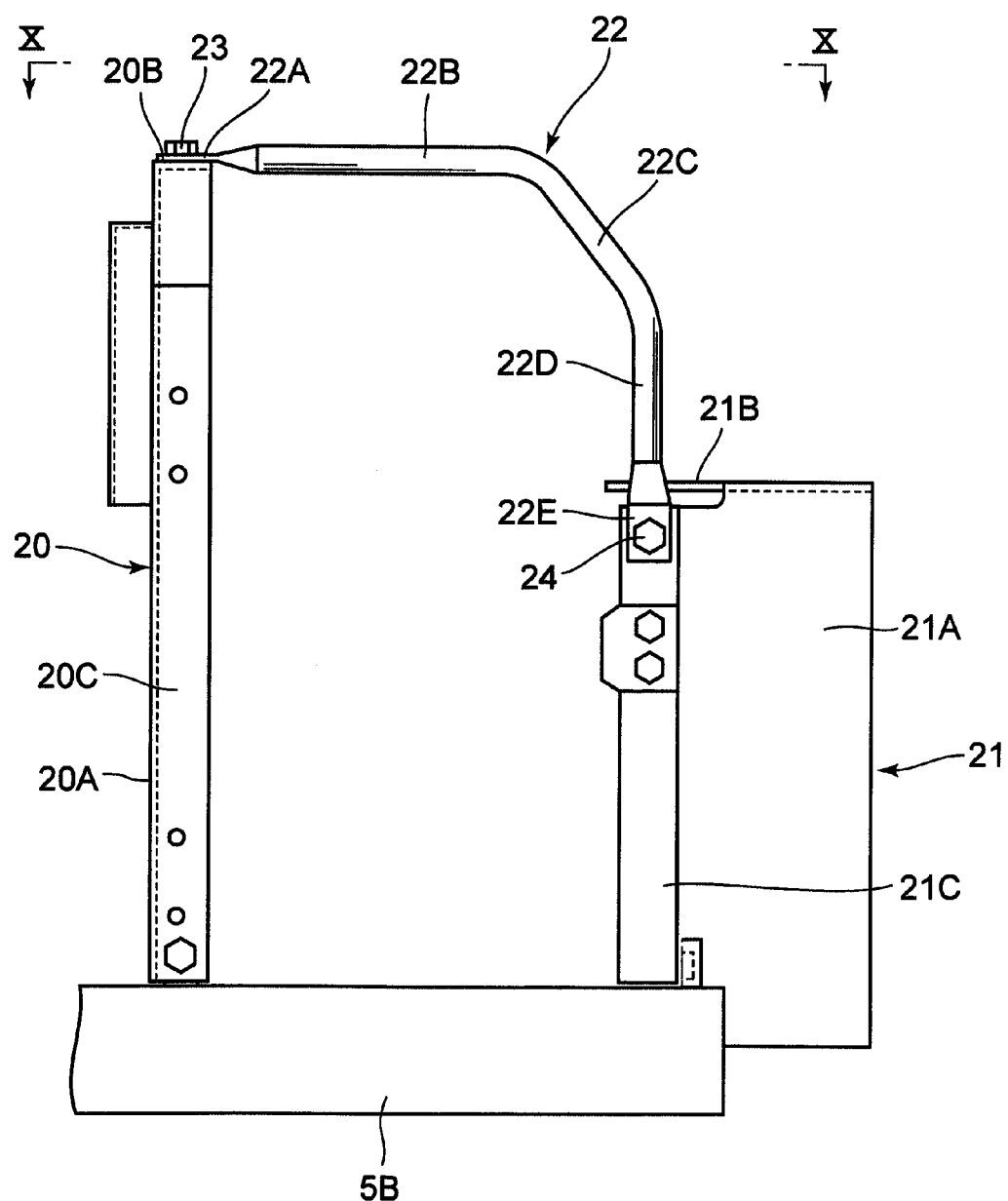
FIG. 9 is a front view of the left front support member, rear support member and connecting support member.
Figure 10:
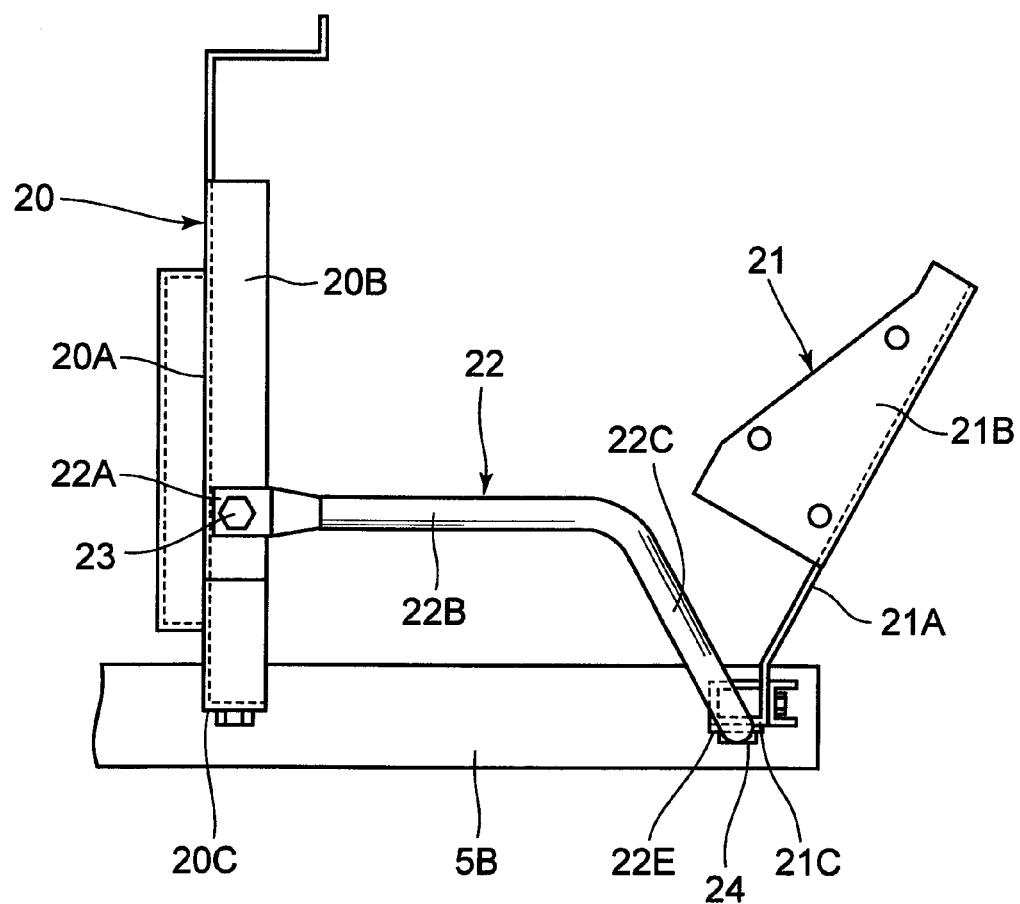
FIG. 10 is a plan view of the left front support member, rear support member and connecting support member, taken from the direction of arrows X-X in FIG. 9.
Figure 11:
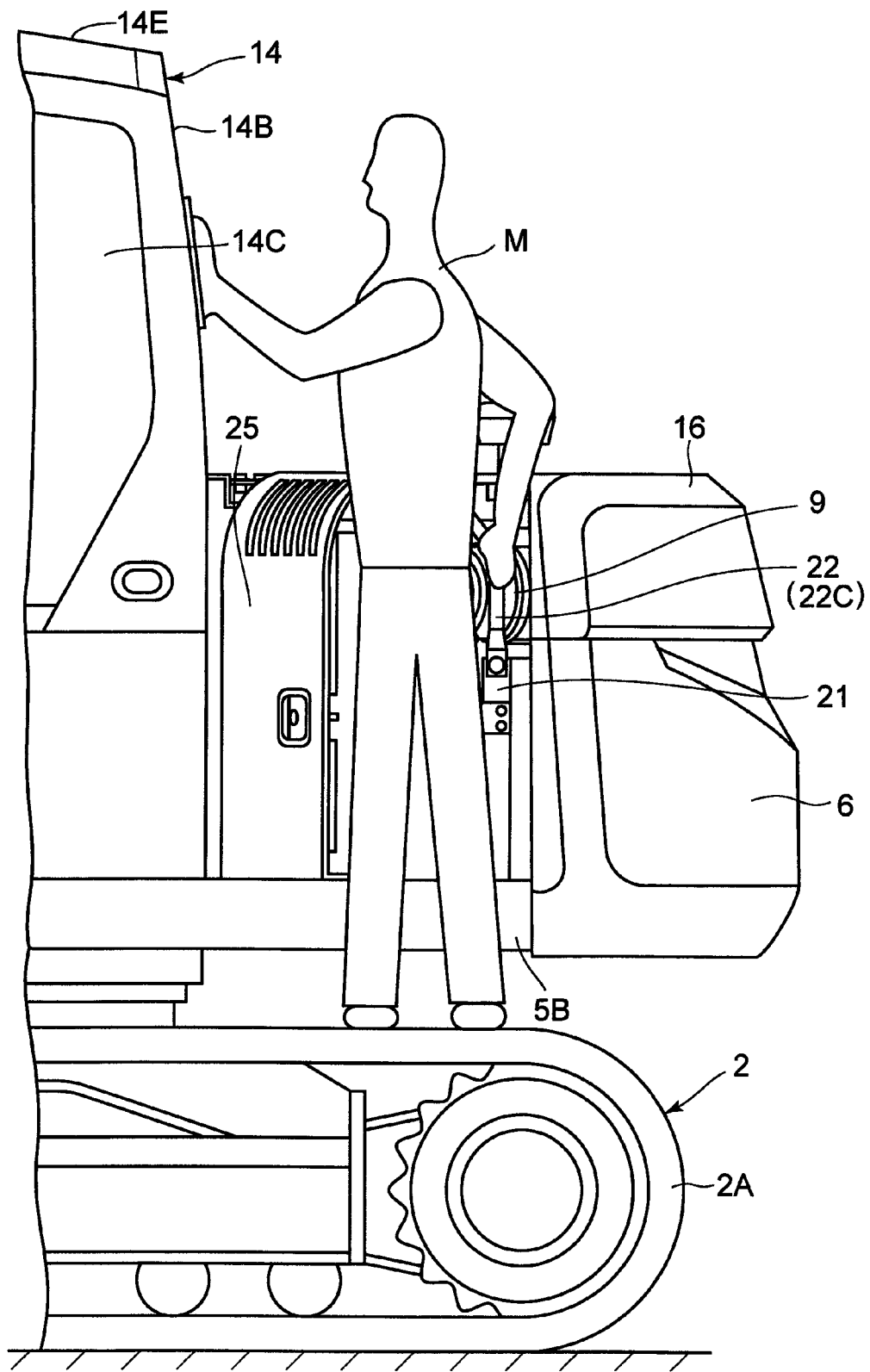
FIG. 11 is a partly cutaway front view showing a servicing worker at work for cleaning the rear face portion of a cab.
Figure 12:
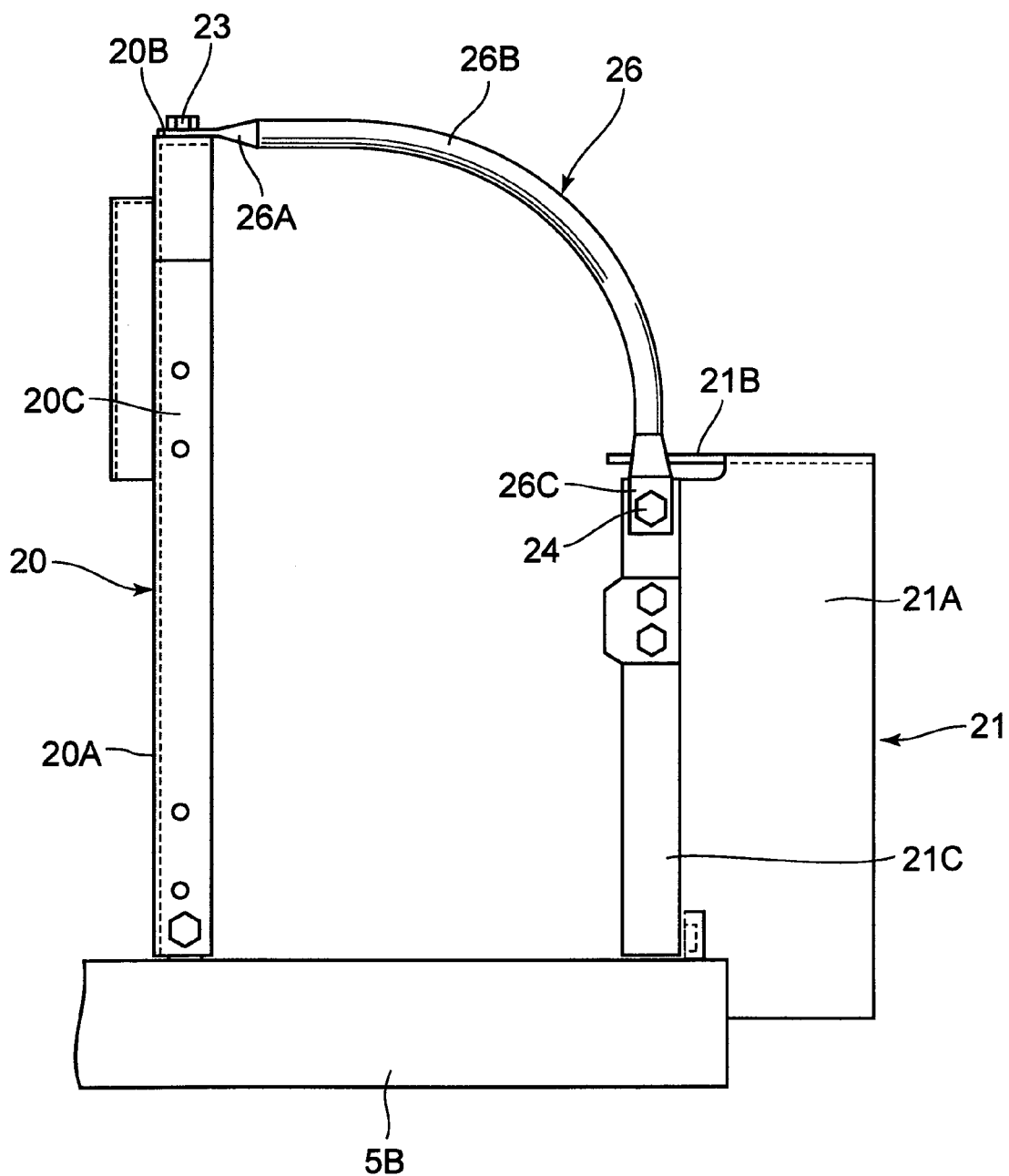
FIG. 12 is a front view similar to FIG. 9, but showing the connecting support member in a first modification according to the invention.
Figure 13:
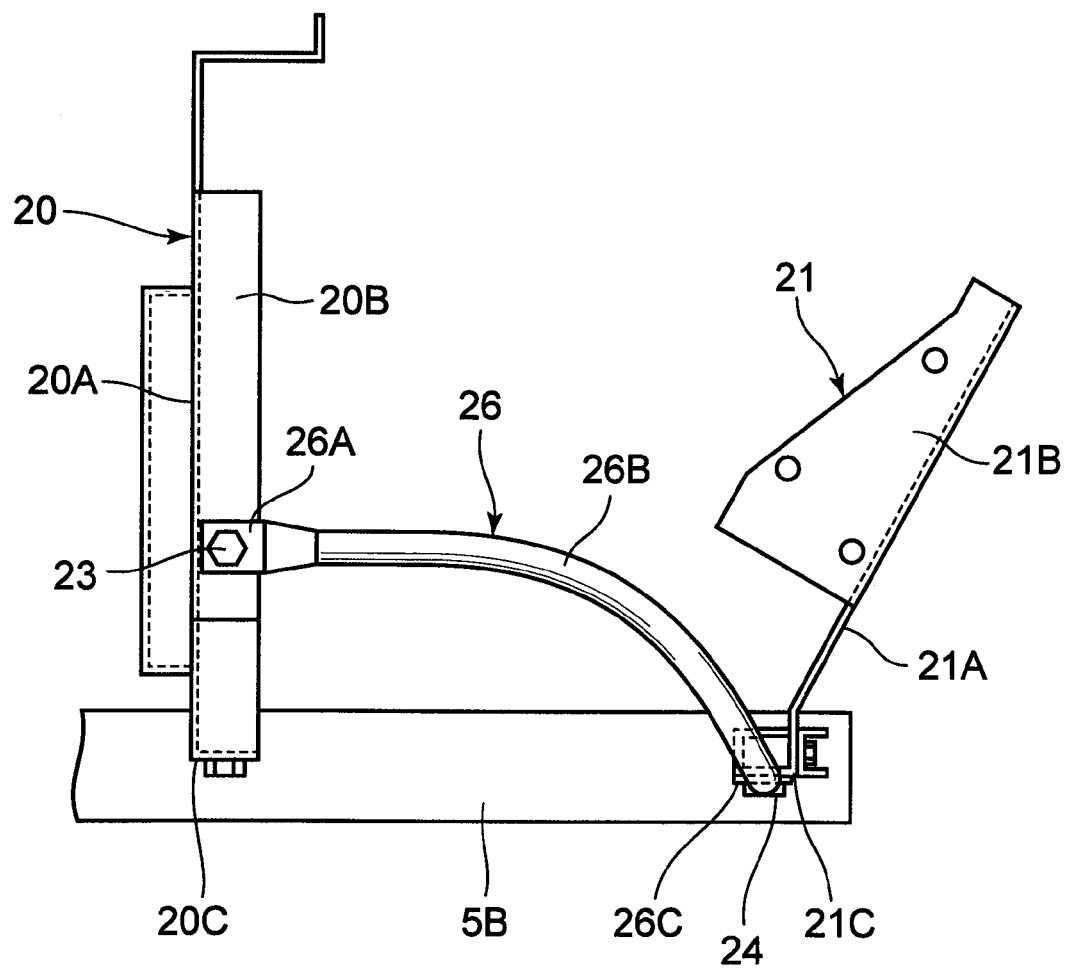
FIG. 13 is a front view similar to FIG. 10, but showing the connecting support member in the first modification according to the invention.

On the other hand, as shown in FIGS. 5, 7 and 11, when the left side housing door 25 is opened, the horizontal grip portion 22B and inclined grip portion 22C of the connecting support member 22 serve as a hand-rail which is extended in forward and rearward directions between the left front support member 20 and rear support member 21. Namely, a servicing worker M of FIG. 11, standing on a crawler belt 2A of the lower structure 2 to perform a cleaning job of the rear face portion 14B of the cab 14, can hold on to the horizontal grip portion 22B or the inclined grip portion 22C of the connecting support member 22 as a hand-rail for support in stabilizing his or her posture. Thus, the connecting support member 22 is located in such a range that, when the left side housing door 25 is opened, a servicing worker M standing on a crawler belt 2A of the lower structure 2 can reach and hold on to the connecting support member 22 while performing a cleaning job of the rear face portion 14B of the cab 14.

Namely, arrangements are made to cope with the problem that, as the top surface 6A of the counterweight 6 is located at a lower level than the top surface of the left side housing door 25, when the engine cover 16 is opened, even if a servicing worker M standing on the crawler belt 2A of the lower structure 2 is unable to grip an upper end portion of the counterweight 6, the servicing worker M can keep a stable posture by holding on to the connecting support member 22.

In this case, when the engine cover 16 is closed as shown in FIG. 5, the horizontal grip portion 22B of the connecting support member 22 is held in abutment against the lower side of the engine cover 16. However, on such an occasion, an ample space is still left between the engine cover 16 and the inclined grip portion 22C of the connecting support member 22, so that a servicing worker M can securely grip the inclined grip portion 22C of the connecting support member 22 (see FIG. 11). When the engine cover 16 is in an open position as shown in FIG. 6, a servicing worker M can grip not only the inclined grip portion 22C but also the horizontal grip portion 22B of the connecting support member 22, so that he or she can grip the horizontal grip portion 22B or the inclined grip portion 22C whichever is suitable when moving in a forward or rearward direction.

Indicated at 25 is a left side housing door which is provided openably and closably between the left front support member 20 and rear support member 21. This left side housing door 25 is located continuously on the left side of the engine cover 16 and extended in forward and rearward directions between the cab 14 and a left end of the counterweight 6. In this instance, at the front end, the left side housing door 25 is hinged pivotally on the vertical side end face portion 20C of the left front support member 20 by the use of hinge mechanisms or the like. The rear end of the left side housing door 25 is fixedly closable on the vertical side end face portion 21C of the rear support member 21 by means of a catch mechanism or the like.

The left side housing door 25 can be swung back and forth between the open position of FIGS. 5 and 11 and the closed position of FIG. 4, covering the air cleaner 9 and heat exchanger 11 from left side when in the closed position. On the other hand, when the left side housing door 25 is swung open to the position of FIG. 11, the air cleaner 9 becomes accessible from outside for inspection or for other purposes, and a servicing worker M on a crawler belt 2A of the lower structure 2 can easily hold on to the inclined grip portion 22C of the connecting support member 22 if necessary.

In this instance, the equipment room 15B which forms the machine room 15 with the engine room 15A is a space which is enclosed and defined by the left front support member 20, rear support member 21, heat exchanger 11 and left side housing door 25. In addition to the air cleaner 9, the equipment room 15B is arranged to accommodate other onboard equipments, for example, such as battery, grease gun and tool box (none of which is shown in the drawings).

In the present embodiment, the connecting support member 22 which is located internally of the equipment room 15B can be easily formed into an arbitrary complicate shape by bending a pipe material. That is to say, the connecting support member 22 can be formed in an arbitrary shape to avoid interferences with the air cleaner 9 or other onboard equipments, permitting to accommodate various equipments in the equipment room 15B rationally with the least spatial losses.

Being arranged as described above, the hydraulic excavator 1 of the present embodiment is put in operation, for example, in a ground excavating operation by an operator who is seated within the cab 14 to manipulate various control levers (not shown) in the cab 14. By the operator, the hydraulic excavator 1 is driven to a working site by the lower structure 2 and carries out a ground excavating operation by means of the working mechanism 4 on the upper revolving structure 3 which is put in swinging movements.

The window panes in the front and rear face portions 14A and 14B of the cab 14 need to be cleaned on a regular basis to wipe off dust which falls and deposits on the window panes of the cab 14 during ground excavating operations. Now, a window pane in the rear face portion 14B of the cab 14 is cleaned, for example, in the manner as follows.

In the first place, the left side housing door 25 is in an open position as shown in FIG. 11 to expose the connecting support member 22 to the outside. In this state, a servicing worker M, standing on a crawler belt 2A of the lower structure 2, can hold, for example, the inclined grip portion 22C of the connecting support member 22 with a right hand while wiping the rear window pane of the rear face portion 14B of the cab 14 with a left hand. In this manner, the servicing worker M can grip the connecting support member 22 as a hand-rail to keep a stable posture suitable for performing a cleaning job of the window panes or the like of the rear face portion 14B in an efficient and safe manner.

As described above, the top surface 6A of the counterweight 6 is located at a lower level than the top surface of the left side housing door 25. Therefore, even when the engine cover 16 is opened, making it difficult for a servicing worker M on the crawler belt 2A of the lower structure 2 to grab an upper end portion of the counterweight 6, the servicing worker M can keep a safe and stable posture by gripping the connecting support member 22.

Besides, the connecting support member 22, which is formed of a pipe of a circular sectional shape, can be gripped more snugly as compared with a connecting support member which is formed of other shaped steel materials such as band steel, angle steel or channel steel. That is to say, while performing a cleaning job, a servicing worker M can grip the connecting support member 22 securely to complete a cleaning job with a higher degree of efficiency and safety.

Further, according to the present embodiment, the connecting support member 22, which is bridged between the left front support member 20 and the rear support member 21, is formed by press-forming and bending a pipe of a circular sectional shape. Therefore, even in a case where it becomes necessary to form the connecting support member 22 in a complicate shape to evade the air cleaner 9 on the rear support member 21 or other equipments, the connecting support member 22 can be formed into a desired shape quite easily by a pipe bending operation.

Accordingly, the connecting support member 22 can be fabricated with higher productivity and at a lower cost as compared with a case where it is fabricated by welding together shape steel materials such as band steel, angle steel, channel steel or the like.

In addition, the equipment room 15B is defined under the connecting support member 22 by the left front support member 20, rear support member 21, heat exchanger 11 and left side housing door 25 to accommodate the air cleaner 9 and other onboard equipments. Interferences with the air cleaner 9 and other onboard equipments in the equipment room 15B can be avoided in an assured manner by bending the connecting support member 22 into a complicate shape. Consequently, the narrow space of the equipment room 15B under the connecting support member 22 can be utilized effectively to accommodate various equipments with the least spatial losses.

In the above-described embodiment, by way of example the connecting support member 22 is formed with in series the fore mounting portion 22A, horizontal grip portion 22B, inclined grip portion 22C, vertical portion 22D and rear mounting portion 22E. However, in this regard, the present invention is not limited to the particular example shown. For example, there may be adopted a connecting support member 26 which is formed with an arcuate grip portion as exemplified in a first modification shown in FIGS. 12 and 13.

Namely, in this case, the connecting support member 26 is formed with a fore mounting portion 26A to be fixedly attached on the left front support member 20 by means of a bolt 23, an arcuate grip portion 26B to be extended arcuately in the forward and rearward direction from the fore mounting portion 26A toward the rear support member 21, and a rear mounting portion 26C to be fixedly attached on the rear support member 21 by means of a bolt 24.

Further, in the above-described embodiment, the connecting support member 22 is formed with the fore mounting portion 22A, horizontal grip portion 22B, inclined grip portion 22C, vertical portion 22D and rear mounting portion 22E, in such a way that the horizontal grip portion 22B is abutted against the lower side of the engine cover 16 when the engine cover is in a closed position (see FIG. 5). However, the present invention is not limited to this particular example. For instance, there may be employed a connecting support member 27 which is formed with a horizontal grip portion at a lowered level as exemplified in a second modification shown in FIGS. 14 and 15.

In this case, the connecting support member 27 is formed with a fore mounting portion 27A to be fixedly attached on the left front support member 20, a front vertical portion 27B which is bent vertically downwardly from the fore mounting portion 27A, a horizontal grip portion 27C which is extended horizontally rearward from the front vertical portion 27B, an inclined grip portion 27D which is inclined in a downward direction from the horizontal grip portion 27C, a rear vertical portion 27E which is extended vertically downward from the inclined grip portion 27D, and a rear mounting portion 27F which is provided at the lower end portion of the rear vertical portion 27E and fixedly attached on the rear support member 21.

Figure 14:
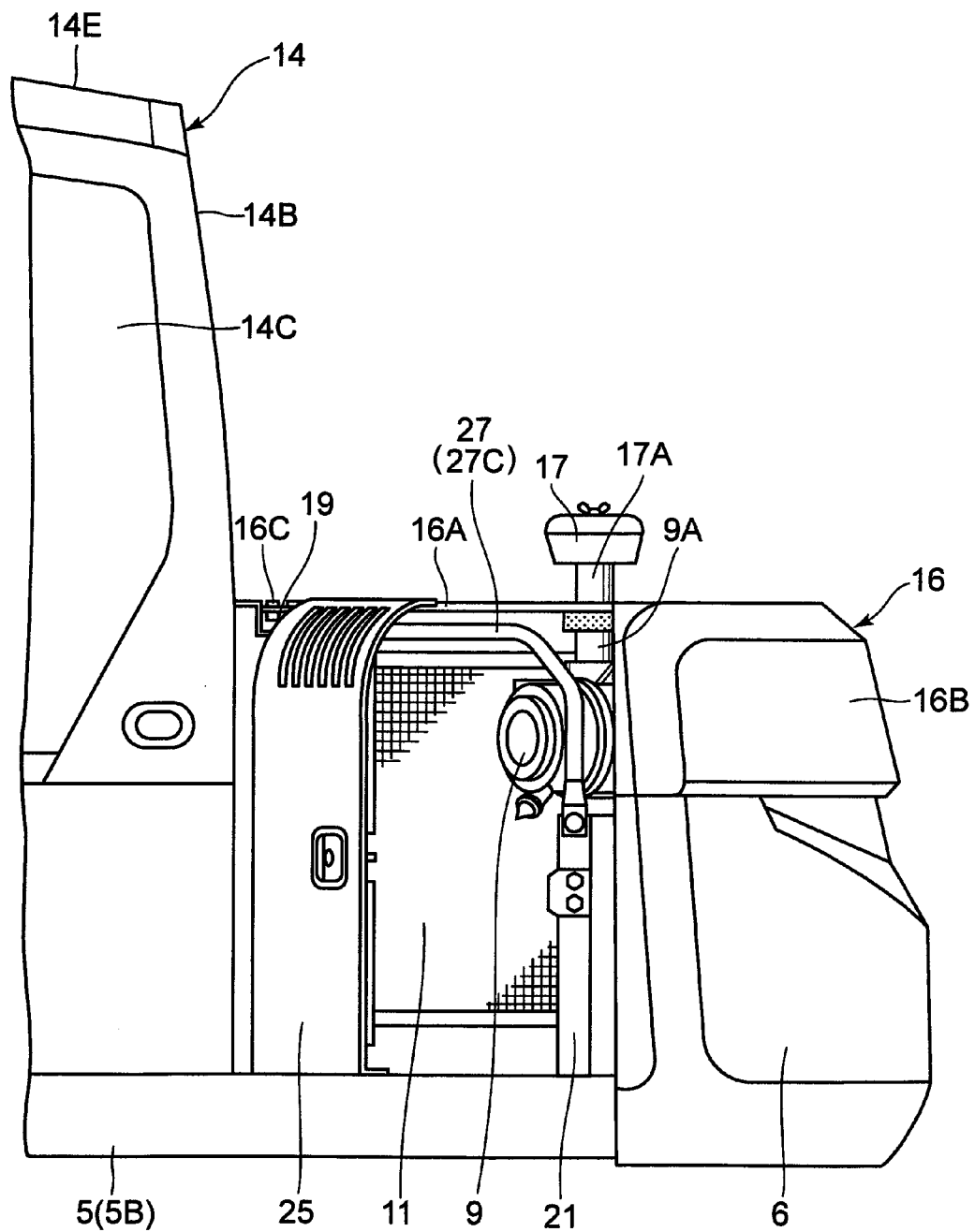
FIG. 14 is a front view similar to FIG. 5, but showing the connecting support member in a second modification according to the invention.
Figure 15:
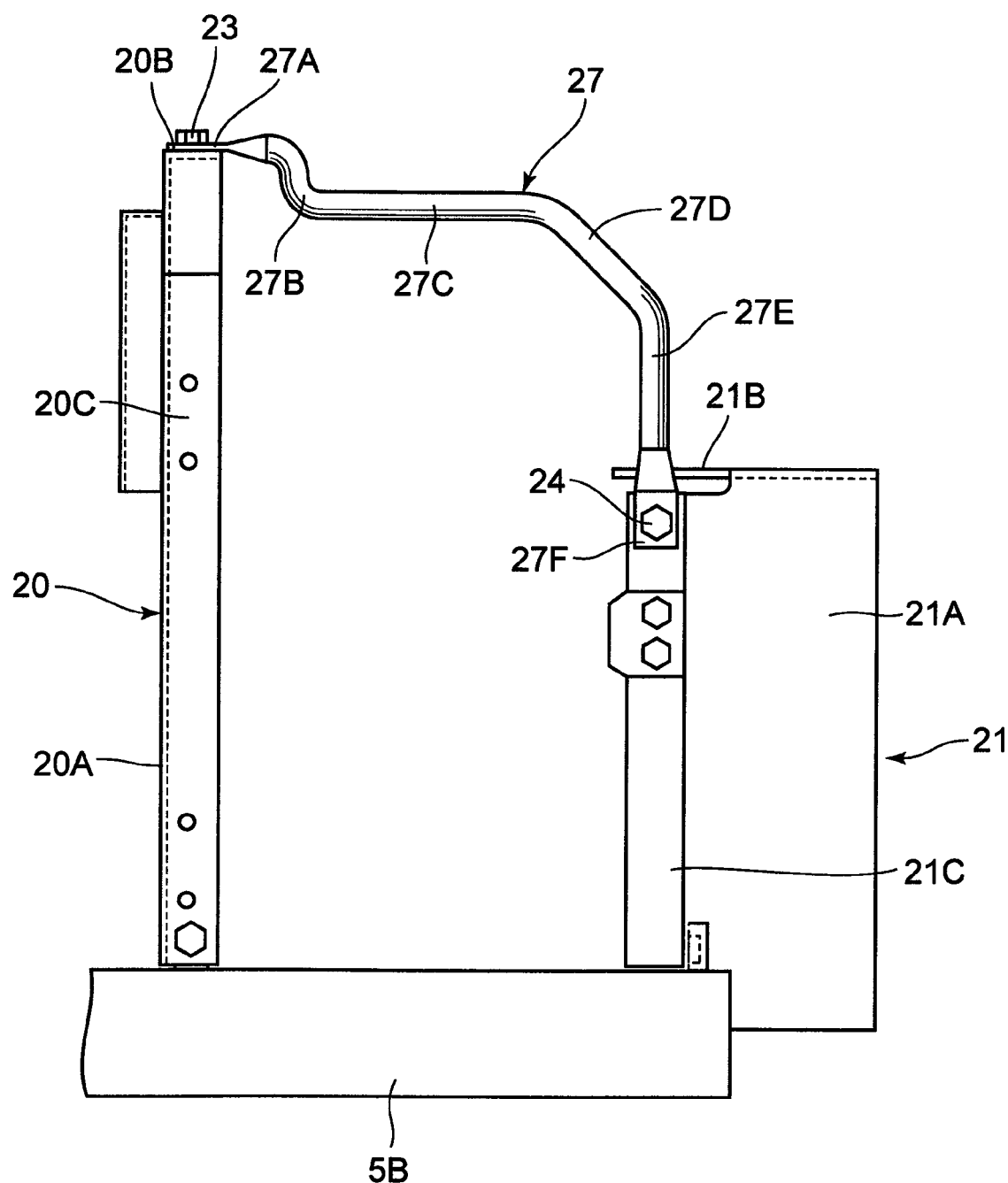
FIG. 15 is a front view similar to FIG. 9, but showing the connecting support member in the second modification according to the invention.

In this case, even when the engine cover 16 is in a closed position as shown in FIG. 14, a gap space is left between the engine cover 16 and the horizontal grip portion 27C of the connecting support member 27, so that a servicing worker M can open the left side housing door 25 and hold on to the horizontal grip portion 27C or to the inclined grip portion 27D while performing, for example, a cleaning job of a window pane in the rear face portion 14B of the cab 14.

Further, in the above-described embodiment, by way of example the connecting support member 22 is located in the vicinity of the left side housing door 25 which forms the machine room 15 to serve as a hand-rail which becomes accessible simply by opening the left side housing door 25. However, the present invention is not limited to this particular example. For instance, the connecting support member may be provided as a hand-rail in the vicinity of the right side housing door 18 if desired.

Furthermore, in the above-described embodiment, by way of example the connecting support member 22 is located in the equipment room 15B which forms the machine room 15 with the engine room 15A. However, the present invention is not limited to this particular example. For instance, a connecting support member may be located in a utility room which is provided separately from the machine room for the purpose of accommodating maintenance tools and parts.

Moreover, in the above-described embodiment, the present invention is applied to a hydraulic excavator 1 which is typical of construction machine. However, it is to be understood that the present invention can be similarly applied to other construction machines such as wheel loaders and hydraulic cranes.

The invention claimed is:

1. A construction machine, having a frame as a support structure which is provided with a working mechanism and a counterweight in front and rear sides thereof, respectively, a cab which is built on a front side of said frame and forms an operator's room, and a machine room which is built on said frame at a position between said cab and said counterweight to accommodate an engine, said machine room being built of a front support member erected on said frame on the rear side of said cab, a rear support member erected on said frame at a position on the rear side of said front support member, an engine cover swingably hinged on said front support member and extended transversely between said cab and counterweight to cover said engine from above, a connecting support member connecting said front support member with said rear support member, and a housing door extended in forward and rearward direction between said counterweight and cab and openably fitted between said front and rear support members, characterized in that:

said housing door is located continuously at one lateral side of said engine cover;

said connecting support member is located under said engine cover and inward of said housing door; and said connecting support member is formed with a grip portion used as a hand-rail while said housing door is in an open state, permitting a servicing worker to hold on to said grip portion no matter whether said engine cover is in an open or closed position.

2. A construction machine as defined in claim 1, wherein said connecting support member is fixedly attached to said front and rear support members at fore and rear ends, respectively, and formed with a longitudinally extending grip portion in an intermediate section between said fore and rear ends.

3. A construction machine as defined in claim 1, wherein said connecting support member is formed by bending a hollow metal pipe into a suitable shape.

4. A construction machine as defined in claim 1, wherein an air cleaner is attached to said engine to supply clean air to said engine, and a heat exchanger is mounted on said frame at a position between said engine and said housing door, said rear support member being adapted to support said air cleaner, and said connecting support member being located transversely between said heat exchanger and said housing door.

5. A construction machine as defined in claim 4, wherein an equipment room is defined beneath said connecting support member by said front support member, rear support member, heat exchanger and housing door to accommodate said air cleaner and other onboard equipments.

6. A construction machine as defined in claim 1, wherein said connecting support member is formed with a horizontal grip portion extended horizontally rearward from said front support member and held in abutting engagement with the lower side of said engine cover when the latter is closed, and an inclined grip portion extended downward toward said rear support member from a rear end of said horizontal grip portion in such a way as to leave an ample space under said engine cover to let a servicing worker grab said inclined grip portion readily even when said engine cover is closed.

* * * * *